(12) United States Patent
Zhou et al.

(10) Patent No.: US 11,580,124 B2
(45) Date of Patent: Feb. 14, 2023

(54) METHOD AND APPARATUS FOR MINING COMPETITION RELATIONSHIP POIS

(71) Applicant: BEIJING BAIDU NETCOM SCIENCE AND TECHNOLOGY CO., LTD., Beijing (CN)

(72) Inventors: Jingbo Zhou, Beijing (CN); Hui Xiong, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 159 days.

(21) Appl. No.: 17/110,144

(22) Filed: Dec. 2, 2020

(65) Prior Publication Data

US 2021/0334278 A1 Oct. 28, 2021

(30) Foreign Application Priority Data

Apr. 22, 2020 (CN) .......................... 202010320647.8

(51) Int. Cl.
*G06F 16/00* (2019.01)
*G06F 16/2458* (2019.01)
(Continued)

(52) U.S. Cl.
CPC ........ *G06F 16/2465* (2019.01); *G06F 16/288* (2019.01); *G06F 16/29* (2019.01);
(Continued)

(58) Field of Classification Search
CPC .... G06F 16/2465; G06F 16/288; G06F 16/29; G06F 16/9024; G06F 2216/03; G06N 3/04; G06N 3/08
See application file for complete search history.

(56) References Cited

U.S. PATENT DOCUMENTS

| 11,232,116 B2* | 1/2022 | Zhou ................... G06F 16/2465 |
| 2011/0179027 A1* | 7/2011 | Das ........................ H04W 4/02 |
| | | 707/736 |

(Continued)

FOREIGN PATENT DOCUMENTS

| CN | 101482864 A | 7/2009 |
| CN | 101963961 A | 2/2011 |

(Continued)

OTHER PUBLICATIONS

Tinghua et al., "Quantifying Spatial Accessibility of Shenzhen's Hospitals by the Isochrone Model," Journal of Geo-information Science, vol. 22, No. 1, Jan. 2020, 6 pages.

*Primary Examiner* — Leslie Wong
(74) *Attorney, Agent, or Firm* — Seed IP Law Group LLP

(57) ABSTRACT

A method and apparatus for mining a competition relationship between POIs. An embodiment of the method includes: acquiring a graphlet mining result obtained by mining map retrieval data of users which encompasses attribute information of retrieved target POIs, the graphlet mining result encompassing occurrence frequencies of respective preset situations, and a preset situation comprising: conforming to attribute information of POIs represented by a corresponding preset graphlet and a preset association relationship between attribute information of at least two POIs; for a first and second POI, determining an occurrence frequency of a preset situation corresponding to a preset graphlet where attribute information of the first and second POI co-occur, and generating a relationship feature of the first and second POI; and inputting the relationship feature into a pre-trained relationship prediction model to obtain a competition relationship prediction result of the first POI and the second POI.

19 Claims, 5 Drawing Sheets

(51) Int. Cl.
  *G06F 16/28*   (2019.01)
  *G06F 16/29*   (2019.01)
  *G06F 16/901*  (2019.01)
  *G06N 3/04*    (2023.01)
  *G06N 3/08*    (2023.01)

(52) U.S. Cl.
  CPC ........... *G06F 16/9024* (2019.01); *G06N 3/04* (2013.01); *G06N 3/08* (2013.01); *G06F 2216/03* (2013.01)

(56) References Cited

U.S. PATENT DOCUMENTS

| | | |
|---|---|---|
| 2019/0370349 A1 | 12/2019 | Saxena |
| 2020/0065302 A1 | 2/2020 | Zhou et al. |
| 2020/0300656 A1* | 9/2020 | Weilert ............. G01C 21/3679 |

FOREIGN PATENT DOCUMENTS

| | | | | |
|---|---|---|---|---|
| CN | 105138668 A | | 12/2015 | |
| CN | 106844402 A | | 6/2017 | |
| CN | 107169005 A | | 9/2017 | |
| CN | 107609185 A | | 1/2018 | |
| CN | 108681586 A | | 10/2018 | |
| CN | 109145219 A | | 1/2019 | |
| CN | 109241225 A | * | 1/2019 | ......... G06F 16/2465 |
| CN | 110110013 A | | 8/2019 | |
| CN | 110119482 A | | 8/2019 | |
| CN | 110134754 A | | 8/2019 | |
| CN | 110647676 A | * | 1/2020 | |
| WO | 2019/227288 A1 | | 12/2019 | |

\* cited by examiner

METHOD AND APPARATUS FOR MINING COMPETITION RELATIONSHIP POIS

CROSS-REFERENCE TO RELATED APPLICATIONS

This application claims priority to Chinese Patent Application No. 202010320647.8, filed with the China National Intellectual Property Administration (CNIPA) on Apr. 22, 2020, the contents of which are incorporated herein by reference in their entirety.

TECHNICAL FIELD

Embodiments of the present disclosure relate to the field of computer technology, specifically to the field of big data technology, and more specifically to a method and apparatus for mining a competition relationship between POIs.

BACKGROUND

Point of Interest (POI) is a geographic information point on a map, which may be a shop, an office building, a landmark building, etc. POI is the core element to provide offline services. There may be a competition relationship between POIs of the same type. Mining and analyzing the competition relationship between different POIs is helpful to targeted planning of the POIs and may increase a POI visit rate.

At present, the analysis on the POI competition relationship mainly relies on the combination of expert experience knowledge and information collection methods such as questionnaires. However, traditional experience knowledge has a high threshold, while the data coverage rate obtained by manual information collection methods such as questionnaires is low. The competition relationship mined based on this often deviates greatly from an actual competition relationship.

SUMMARY

Embodiments of the present disclosure provide a method and apparatus for mining a competition relationship between POIs, an electronic device and a computer readable storage medium.

According to a first aspect, some embodiments of the present disclosure provide a method for mining a competition relationship between points of interest (POIs), the method includes: acquiring a graphlet mining result obtained by mining map retrieval data of users, the map retrieval data comprising attribute information of retrieved target POIs, the graphlet mining result comprising occurrence frequencies of respective preset situations, and a preset situation comprising: conforming to attribute information of POIs represented by a corresponding preset graphlet and a preset association relationship between attribute information of at least two POIs represented by the corresponding preset graphlet; for a first POI and a second POI between which a competition relationship is to be determined, determining, based on the graphlet mining result, an occurrence frequency of a preset situation corresponding to a preset graphlet where attribute information of the first POI and attribute information of the second POI co-occur, and generating a relationship feature of the first POI and the second POI based on the determined occurrence frequency of the preset situation corresponding to the preset graphlet where the attribute information of the first POI and the attribute information of the second POI co-occur; and inputting the relationship feature of the first POI and the second POI into a pre-trained relationship prediction model to obtain a competition relationship prediction result of the first POI and the second POI.

According to a second aspect, some embodiments of the present disclosure provide an apparatus for mining a competition relationship between POIs, the apparatus includes: a first acquisition unit, configured to acquire a graphlet mining result obtained by mining map retrieval data of users, the map retrieval data comprising attribute information of retrieved target POIs, the graphlet mining result comprising occurrence frequencies of respective preset situations, and a preset situation comprising: conforming to attribute information of POIs represented by a corresponding preset graphlet and a preset association relationship between attribute information of at least two POIs represented by the corresponding preset graphlet; a first feature extraction unit, configured to, for a first POI and a second POI between which a competition relationship is to be determined, determine, based on the graphlet mining result, an occurrence frequency of a preset situation corresponding to a preset graphlet where attribute information of the first POI and attribute information of the second POI co-occur, and generating a relationship feature of the first POI and the second POI based on the determined occurrence frequency of the preset situation corresponding to the preset graphlet where the attribute information of the first POI and the attribute information of the second POI co-occur; and a prediction unit, configured to input the relationship feature of the first POI and the second POI into a pre-trained relationship prediction model to obtain a competition relationship prediction result of the first POI and the second POI.

According to a third aspect, some embodiments of the present disclosure provide an electronic device, includes: at least one processor; and a memory, communicatively connected to the at least one processor; where the memory, storing instructions executable by the at least one processor, the instructions, when executed by the at least one processor, cause the at least one processor to perform the method for mining a competition relationship between POIs according to the first aspect.

According to a fourth aspect, some embodiments of the present disclosure provide a non-transitory computer readable storage medium, storing computer instructions, the computer instructions, being used to cause the computer to perform the method for mining a competition relationship between POIs according to the first aspect.

The technology according to the present disclosure can efficiently obtain reliable analysis results of the competition relationship between POIs, without relying on empirical knowledge and manual collection information, thereby reducing costs.

It should be understood that the content described herein is not intended to identify the key or important features of embodiments of the present disclosure, nor is it intended to limit the scope of the present disclosure. Other features of the present disclosure will be easily understood by the following description.

BRIEF DESCRIPTION OF THE DRAWINGS

By reading the detailed description of non-limiting embodiments with reference to the following accompanying drawings, other features, objectives and advantages of the present disclosure will become more apparent.

DETAILED DESCRIPTION OF EMBODIMENTS

Figure 1:
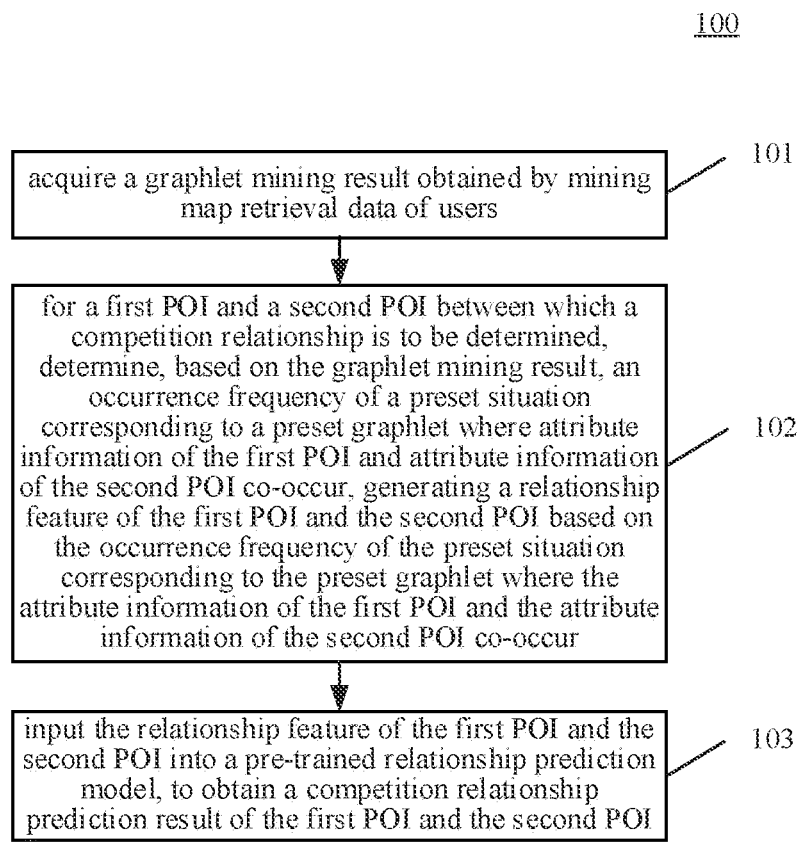
FIG. 1 is a flowchart of a method for mining a competition relationship between POIs according to an embodiment of the present disclosure.

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

The following describes exemplary embodiments of the present disclosure with reference to the accompanying drawings, which include various details of the embodiments of the present disclosure to facilitate understanding, and should be regarded as merely exemplary. Therefore, those of ordinary skill in the art should realize that various changes and modifications may be made to the embodiments described herein without departing from the scope and spirit of the present disclosure. Likewise, for clarity and conciseness, descriptions of well-known functions and structures are omitted in the following description.

The method or apparatus in the present disclosure may be applied to a system architecture including a terminal device, a network, and a server. The network is used to provide a communication link medium between the terminal device and the server, and may include various connection types, such as wired, wireless communication links, or optic fibers.

The terminal device may be a client device, on which various client applications may be installed. For example, search applications, map navigation applications, etc. The terminal device may be hardware or software. When the terminal device is hardware, it may be various electronic devices, including but not limited to smart phones, tablet computers, e-book readers, laptop portable computers, desktop computers, and so on. When the terminal device is software, it may be installed in the electronic devices listed above. It may be implemented as a plurality of software or software modules, or as a single software or software module, which is not specifically limited herein.

The server may be a server that operates various services, such as a server that operates navigation services, information search services, and other services. The server may acquire retrieval data of a user, and mine data related to a geographic location in the retrieval data of the user.

It should be noted that the server may be hardware or software. When the server is hardware, it may be implemented as a distributed server cluster composed of a plurality of servers, or as a single server. When the server is software, it may be implemented as a plurality of software or software modules (for example, a plurality of software or software modules used to provide distributed services), or as a single software or software module, which is no specifically limited herein.

It should be noted that the method for mining a competition relationship between POIs provided by embodiments of the present disclosure may be executed by the terminal device or the server. Accordingly, an apparatus for mining a competition relationship between POIs may be provided in the terminal device or the server.

With reference to FIG. 1, illustrating a flow 100 of a method for mining a competition relationship between POIs according to an embodiment of the present disclosure. The method of mining a competition relationship between POIs includes:

Step 101, acquiring a graphlet mining result obtained by mining map retrieval data of users.

In the present embodiment, an executing body of the method for mining a competition relationship between POIs may acquire map retrieval data of users. The map retrieval data of a user is data of that the user retrieves geographic information points in a map, which may include attribute information of a retrieved target POI. The target POI is a POI retrieved by the user, which may be a scenic spot, a shop, a public transport station, and so on.

In practice, the executing body may acquire the map retrieval data saved when the user using a search app to retrieve POIs, and collect map retrieval data from a large number of users at various times to analyze a competition relationship between different POIs.

The executing body may acquire the graphlet mining result obtained by mining the map retrieval data of users. The graphlet mining result includes occurrence frequencies of respective preset situations.

Here, the graphlet mining result may be obtained in advance as follows:

First, constructing preset graphlets, a preset graphlet includes nodes and edges between nodes. Each node may correspond to a POI or correspond to a type of attribute information of a POI. The attribute information may include, for example, one or more of identification, category, geographic location area, etc. An edge between nodes represents an association relationship between attribute information of the POIs corresponding to the two nodes. Here, the association relationship may be that two POIs are associately retrieved by a same user in the map retrieval data of users, or may be that two POIs corresponding to the two piece of attribute information are associately retrieved by the same user in the map retrieval data of users. If a user jointly retrieves POI 1 and POI 2 in a retrieval operation, or the user retrieves POI 1 first and then POI 2 in a short time period, then it may be determined that POI 1 and POI 2 are associately retrieved by the user.

The preset graphlet may include a preset number of nodes, corresponding to a preset number of POIs. The preset number is not less than 2. A random combination of the relationships between the preset number of POIs may obtain several combination manners, and each combination manner may correspond to a preset graphlet. Here, each preset graphlet respectively represents attribute information of the POIs corresponding to the nodes included therein and a preset association relationship between the attribute information of the POIs corresponding to the nodes included therein.

Second, on the basis of the map retrieval data of users, counting the occurrence frequencies of preset situations to obtain the graphlet mining result. The preset situation includes conforming to the attribute information of the POIs represented by a corresponding preset graphlet and a preset association relationship between attribute information of at least two POIs.

Specifically, for each preset graphlet, on the basis of the map retrieval data of users, the frequency of the preset situation, where the attribute information of a preset number of target POIs is consistent to the attribute information of all POIs represented by the preset graphlet and the relationship between the attribute information of the preset number of target POIs conforms to the relationship between the attribute information of all POIs represented by the preset graphlet, may be counted, to obtain the graphlet mining result.

As an example, the preset graphlets include graphlet 1 and graphlet 2. Each of graphlet 1 and graphlet 2 include two nodes, and each node corresponds to a food type POI, and attribute information of the two POIs in each of graphlet 1 and graphlet 2 is of types of "grilled fish" and "hot pot" respectively. The association relationship between the attribute information of the two POIs in graphlet 1 is: in a use of a geographic location search application, a user first searched for "grilled fish" food stores and then searched for "hot pot" food stores. The association relationship between the attribute information of the two POIs in graphlet 2 is: a user first searched for "hot pot" food stores and then searched for "grilled fish" food stores. Then, on the basis of the map retrieval data of users, the occurrence frequency of the situation where a user first searches for "grilled fish" food stores and then searches for "hot pot" food stores in a use of the geographic location search application may be counted, as the occurrence frequency of the preset situation corresponding to graphlet 1; and the occurrence frequency of the situation where a user first searches for "hot pot" food stores and then searches for "grilled fish" food stores in a use of the geographic location search application may be counted, as the occurrence frequency of the preset situation corresponding to graphlet 2. The occurrence frequency of the preset situation corresponding to graphlet 1 and the occurrence frequency of the preset situation corresponding to graphlet 2 are used as the graphlet mining result.

By performing frequency counting on respective target POIs retrieved by users in the map retrieval data of users according to each preset graphlet, a mining result containing the relationship between the attribute information of at least two target POIs may be obtained.

Step 102, for a first POI and a second POI between which a competition relationship is to be determined, determining, based on the graphlet mining result, an occurrence frequency of a preset situation corresponding to a preset graphlet where attribute information of the first POI and attribute information of the second POI co-occur, generating a relationship feature of the first POI and the second POI based on the occurrence frequency of the preset situation corresponding to the preset graphlet where the attribute information of the first POI and the attribute information of the second POI co-occur.

In the present embodiment, the attribute information of the first POI and the second POI between which a competition relationship is to be determined may be acquired, to determine a preset graphlet where the attribute information of the first POI and the attribute information of the second POI co-occur. Then, in the graphlet mining result, the occurrence frequency of each preset situation respectively corresponding to each preset graphlet where the attribute information of the first POI and the attribute information of the second POI co-occur is acquired, to form a frequency group or a frequency sequence. Each frequency in the frequency group or frequency sequence corresponds to one preset graphlet. The frequency group or frequency sequence may be used as the relationship feature of the first POI and the second POI, or the frequency data or frequency sequence may be processed, such as normalized and/or vectorized, and the processed frequency data or frequency sequence may be used as the relationship feature of the first POI and the second POI.

Step 103, inputting the relationship feature of the first POI and the second POI into a pre-trained relationship prediction model, to obtain a competition relationship prediction result of the first POI and the second POI.

The relationship prediction model may be pre-trained and obtained based on competition relationship annotation information of sample pairs of POIs. A sample pair of POIs may undergo the same processing as in the above step 102 to obtain the relationship feature of two sample POIs in the sample pair of POIs. The annotation information may be manually annotated information. The annotation information may represent whether there is a competition relationship between the two sample POIs.

In the present embodiment, the relationship prediction model may be a model constructed based on a convolutional neural network. The relationship feature of the first POI and the second POI obtained in step 102 may be input into the relationship prediction model to obtain the competition relationship prediction result of the first POI and the second POI. The competition relationship prediction result may be a probability value of that competition relationship exists between the two, or a binary classification result of whether there is a competition relationship between the two.

The method for mining a competition relationship between POIs in the foregoing embodiment can efficiently obtain reliable analysis results of the competition relationship between POIs, without relying on empirical knowledge or manual collection information, thereby reducing costs. Moreover, the mining method based on graphlet structure can improve the accuracy of the analysis results of the competition relationship between POIs.

In some embodiments, the relationship feature of the first POI and the second POI may be generated as follows:

First, acquiring a first sorting list of the occurrence frequencies of the respective preset situations, and a second sorting list of a preset number of hot preset situations ranked top in the first sorting list. The first sorting list is a list sorting the occurrence frequencies of the preset situations corresponding to preset graphlets in descending order, and the second sorting list is a list of a preset number of preset situations, which are ranked top in the first sorting list, selected from the first sorting list.

Second, generating the first relationship feature of the first POI and the second POI based on a ranking position of each preset graphlet where the attribute information of the first POI and the attribute information of the second POI co-occur in the first sorting list and occurrence frequencies of corresponding preset situations, and generating a second relationship feature of the first POI and the second POI based on a ranking position of each preset graphlet where the attribute information of the first POI and the attribute information of the second POI co-occur in the second sorting list and occurrence frequencies of corresponding preset situations.

For the first POI and the second POI, if it is determined that the attribute information of the first POI and the attribute information of the second POI co-occur in a same preset graphlet, then the occurrence frequency of the preset situation corresponding to the preset graphlet where the attribute information of the first POI and the attribute information of the second POI co-occur, and the ranking position of the preset graphlet where the attribute information of the first POI and the attribute information of the second POI co-occur in the first sorting list, are used as the first relationship feature of the first POI and the second POI.

Similarly, the occurrence frequency of the preset situation corresponding to the preset graphlet where the attribute information of the first POI and the attribute information of the second POI co-occur, and the ranking position of the preset graphlet where the attribute information of the first POI and the attribute information of the second POI co-occur in the second sorting list, are used as the second relationship feature between the first POI and the second POI.

Since the first sorting list and the second sorting list contain sorting information about the occurrence frequencies of different relationships between POIs, the generated first relationship feature and second relationship feature can more accurately represent a relative relationship between the first POI and the second POI in all target POIs, so that the difference in closeness of the association relationships between the first POI and different second POIs may be accurately measured, so as to obtain a more accurate and objective competition relationship analysis result.

Figure 2:
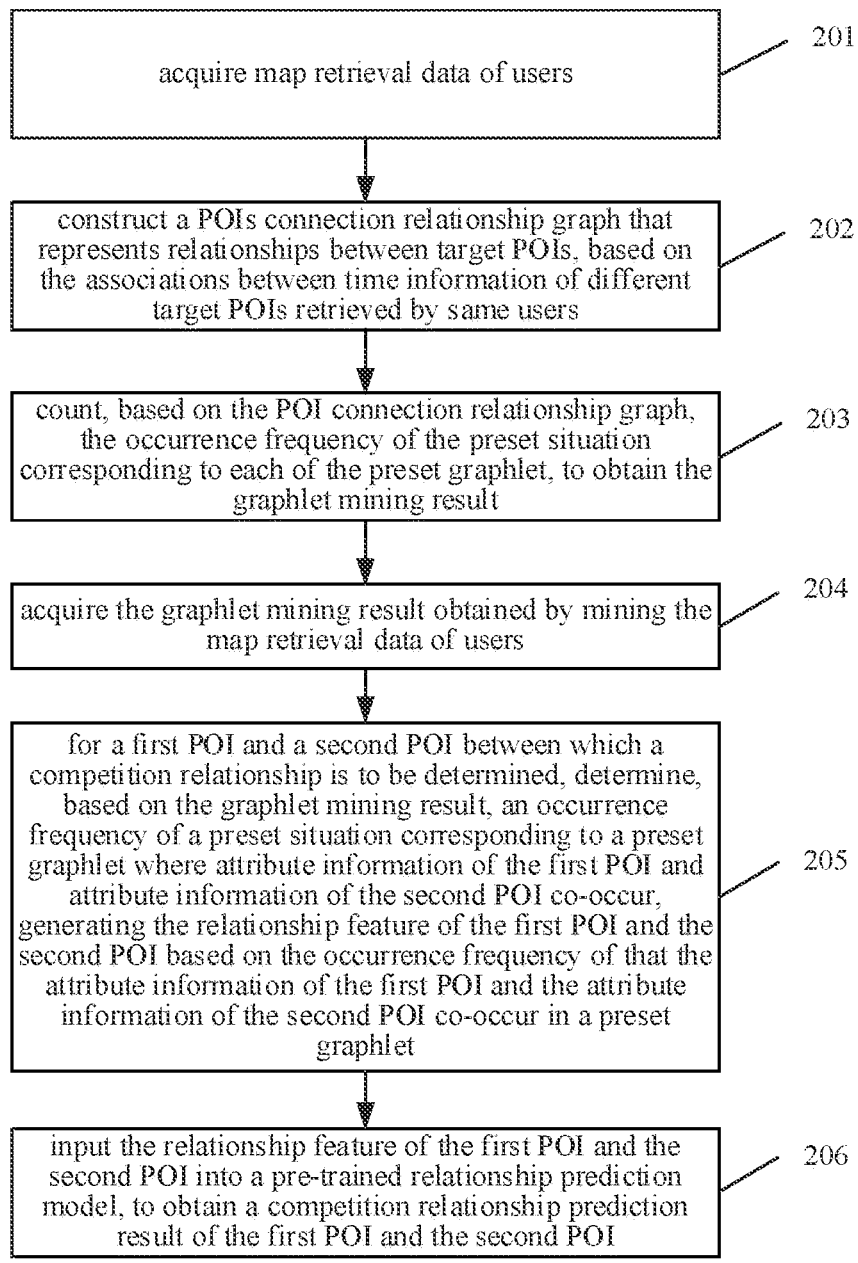
FIG. 2 is a flowchart a method for mining a competition relationship between POIs according to another embodiment of the present disclosure.

With further reference to FIG. 2, illustrating a schematic flowchart of a method for mining a competition relationship between POIs according to another embodiment of present disclosure. As shown in FIG. 2, a flow 200 of the method for mining a competition relationship between POIs includes the following steps:

Step 201, acquiring map retrieval data of users.

In the present embodiment, the map retrieval data may be acquired by collecting retrieval operation behavior data generated when users use a map navigation application, a search application, or other applications. The map retrieval data include attribute information of a retrieved target POI and time information when the user retrieves the target POI. The attribute information of the target POI may include at least one of identification, geographic location, geographic location area, category, or historical user visit data, of the target POI. The time information when the user retrieves the target POI is the time when the user's retrieval behavior for the target POI occurs.

Step 202, constructing a POIs connection relationship graph that represents a relationship between target POIs, based on the association between time information of different target POIs retrieved by a same user.

Nodes in the POIs connection relationship graph may be constructed first, and each node in the connection relationship diagram corresponds to a target POI. Then, for two different target POIs, whether the time information of the two target POIs retrieved by a same user has association is determined, that is, whether retrieval time information of the two target POIs has association is determined. If yes, an edge between the nodes corresponding to the two target POIs may be added. So that by analyzing map retrieval data of a large number of users, a plurality of edges in the POIS connection relationship graph may be constructed. Each edge represents that there is an association between the retrieval time information of the target POIs corresponding to the two nodes connected by the edge.

The association of the above retrieval time information may be determined as follows: if a same user retrieves two target POIs within a preset time interval (for example, within 10 minutes), it is determined that the retrieval time information of the two target POIs has association.

Alternatively, the association of the above retrieval time information may be determined as follows: counting the number of user retrieval operations of retrieving two target POIs successively within a preset time interval in the map retrieval data. If the number of user retrieval operations of retrieving two target POIs successively within a preset time interval exceeds a preset threshold θ, it is determined that the retrieval time information of the two target POIs has association.

Alternatively, the association of the above retrieval time information may be determined as follows: in the map retrieval data, counting the number of user retrieval operations of retrieving target POI 1 first and then retrieving target POI 2 within a preset time interval, and the number of user retrieval operations of retrieving target POI 2 first and then retrieving target POI 1 within the preset time interval, and if the number of user retrieval operations of retrieving target POI 1 first and then retrieving target POI 2 within the preset time interval exceeds the preset threshold θ, and the number of user retrieval operations of retrieving target POI 2 first and then retrieving target POI 1 within the preset time interval exceeds the preset threshold θ, it is determined that the retrieval time information of target POI 1 and target POI t 2 has association.

Step 203, counting, based on the POI connection relationship graph, the occurrence frequency of the preset situation corresponding to each of the preset graphlet, to obtain the graphlet mining result.

In the present embodiment, graphlet mining may be performed based on the POIs connection relationship graph. The graphlet mining result includes the occurrence frequencies of respective preset situations, and a preset situation includes conforming to attribute information of POIs represented by a preset graphlet corresponding thereto and a preset association relationship between attribute information of at least two POIs represented by the preset graphlet corresponding thereto.

Here, the preset graphlet includes a preset number of nodes, for example, including three nodes, and each node corresponds to one POI or one type of attribute information of one POI. For example, each node corresponds to a category of a POI, or a geographic location area to which a POI belongs, or a historical user visits feature of a corresponding POI. The edge between nodes in the preset graphlet represents that the retrieval time information of the POIs corresponding to the two nodes connected by the edge have a association. A plurality of preset graphlets may be constructed, and different preset graphlets may represent different relationships between attribute information of different POIs.

Then, based on the POIs connection relationship graph, the occurrence frequency of the preset situation corresponding to each of the preset graphlet may be counted, where the preset situation includes conforming to attribute information of a POI represented by a preset graphlet corresponding thereto and a preset association relationship between attribute information of at least two POIs represented by the preset graphlet corresponding thereto. The preset association relationships corresponding to different preset graphlets are different.

Here, the POIs connection relationship graph is constructed based on a large number of retrieved target POIs in the map retrieval data, and the preset graphlet only contains attribute information of a few number of POIs and relationships between attribute information of the few number of POIs. The POIs relationship graph may include attribute information of POIs represented by a plurality of sets of preset graphlets and preset association relationships between attribute information of at least two POIs represented by the plurality of sets of preset graphlets. The number of each preset graphlet may be extracted from the POIs connection relationship graph, that is, the occurrence frequency of the preset situation corresponding to each preset graphlet may be counted, and used as the graphlet mining result.

Step 204, acquiring the graphlet mining result obtained by mining the map retrieval data of users.

The executing body of the method for mining a competition relationship between POIs may acquire the graphlet mining result obtained in step 203.

Step 205, for a first POI and a second POI between which a competition relationship is to be determined, determining, based on the graphlet mining result, an occurrence frequency of a preset situation corresponding to a preset graphlet where attribute information of the first POI and attribute information of the second POI co-occur, generating the relationship feature of the first POI and the second POI based on the occurrence frequency of that the attribute information of the first POI and the attribute information of the second POI co-occur in a preset graphlet.

Step 206, inputting the relationship feature of the first POI and the second POI into a pre-trained relationship prediction model, to obtain a competition relationship prediction result of the first POI and the second POI.

Step 205 and step 206 of the present embodiment are respectively consistent with step 102 and step 103 of the foregoing embodiment. For the specific implementation of step 205 and step 206, reference may be made to the description of step 102 and step 103 in the foregoing embodiment respectively, and detailed description thereof will be omitted.

The above embodiment constructs the POIs connection relationship graph based on the map retrieval data of users, which can accurately extract and represent the association relationship between different POIs, so that when performing graphlet mining, each preset graphlet may be intuitively and accurately extracted based on the point-of-interest connection relationship graph and the number of the preset graphlets may be counted, to obtain the graphlet mining result, which can improve the efficiency and accuracy of graphlet mining, thereby improving an analysis efficiency of the competition relationship between POIs and the accuracy of the analysis results.

In some alternative implementations of the above embodiments, the preset graphlet includes at least one first preset graphlet, a first preset graphlet representing attribute information of a pair of associated POIs and an association relationship between attribute information of the pair of POIs and at least one neighboring POI.

Figure 3:
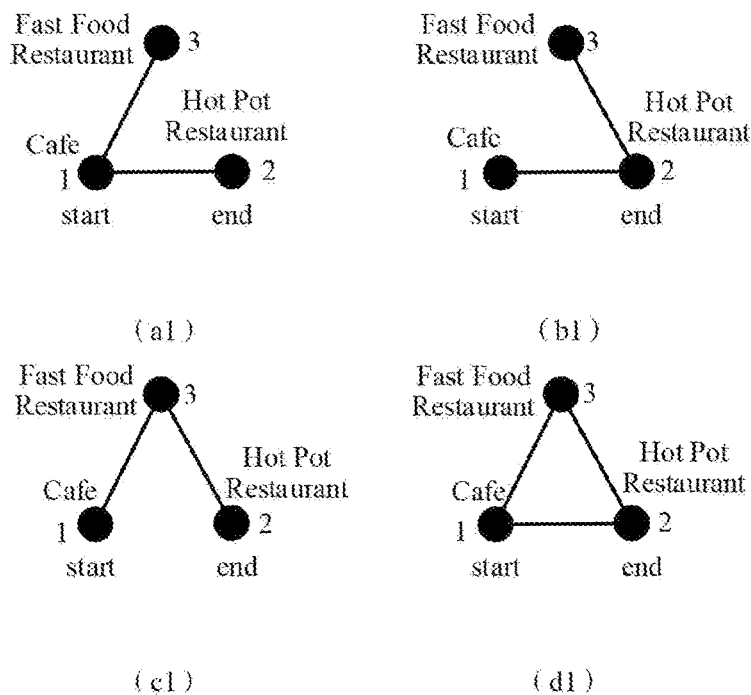
FIG. 3 is a schematic diagram of a first preset graphlet.

With reference to FIG. 3, illustrating a schematic structural diagram of a first preset graphlet. The first preset graphlet includes node 1, node 2, and node 3, where node 1 and node 2 represent two POIs in a pair of POIs, and node 3 represents a neighboring POI of a POI in the pair of POIs. Here, a neighboring POI of a POI "a" refers to a POI connecting to the node corresponding to the POI "a" by an edge. More specifically, the POI "a" and the node corresponding to the neighboring POI are connected to each other by an edge, representing there is association between the retrieval time information of the POI "a" and the neighboring POI.

Alternatively, in the first preset graphlet, two POIs in the pair of POIs are respectively marked as a start node and an end node in the first preset graphlet. Here, the start node represents the POI retrieved first in the pair of POIs retrieved by the user within a preset time interval, and the end node represents the POI retrieved later in the pair of POIs retrieved by the user within the preset time interval.

FIG. 3 is a schematic diagram of three different first preset graphlets, with the first preset graphlet including three nodes as an example. In FIG. 3, the three nodes in the first preset graphlet respectively represent the categories of three POIs, specifically "cafe", "hot pot restaurant", and "fast food restaurant", and two of the POIs respectively have the start node label "start" and the end node label "end". In the four examples (a1), (b1), (c1), and (d1) of the first preset graphlet shown in FIG. 3, two nodes are connected to represent that there is an association relationship between the categories of two POIs corresponding to the two nodes; in addition to the start node and the end node, another node is only connected to the start node or the end node in the examples (a1) and (b1), which represents that the node only has an association relationship with the category of the POI corresponding to the start node or the end node respectively. The example (c1) represents that there is association relationships between the category of a neighboring POI and the categories of the POIs corresponding to the start node and the end node, and there is no association relationship between the categories of the POIs represented by the start node and the end node. The example (d1) represents that there is association relationships between the category of the neighboring POI and the categories of the POIs corresponding to the start node and the end node, and there is an association relationship between the categories of the POIs represented by the start node and the end node. Here, the association relationship between the categories of two POIs may be that the POIs of two categories are retrieved by a same user within a preset time interval, or the number of occurrences of the POIs of two categories being retrieved by the same user within the preset time interval exceeds a preset threshold.

The above first preset graphlet contains the association relationship between the attribute information of POIs. Thus, the graphlet mining result for the first preset graphlet includes an association relationship feature of the attribute information of the POIs, so that the competition relationship between POIs may be determined based on the attribute information of the POIs.

Alternatively, the preset graphlet may further include at least one second preset graphlet, the second preset graphlet representing a pair of associated POIs and an association relationship between the pair of POIs and at least one neighboring POI. Here, a node in the second preset graphlet represents a POI, and an edge between nodes represents an association relationship between the POIs corresponding to the two nodes connected by the edge. Here, the association relationship between two POIs may be that the two POIs are retrieved by a same user within a preset time interval, or the number of occurrences of the two POIs retrieved by the same user within the preset time interval exceeds a preset threshold. Further, according to the order in which the user retrieves the POIs, the start node label "start" may be set for the first retrieved POI in the second preset graphlet, and the end node label "end" may be set for the later retrieved POI.

Figure 4:
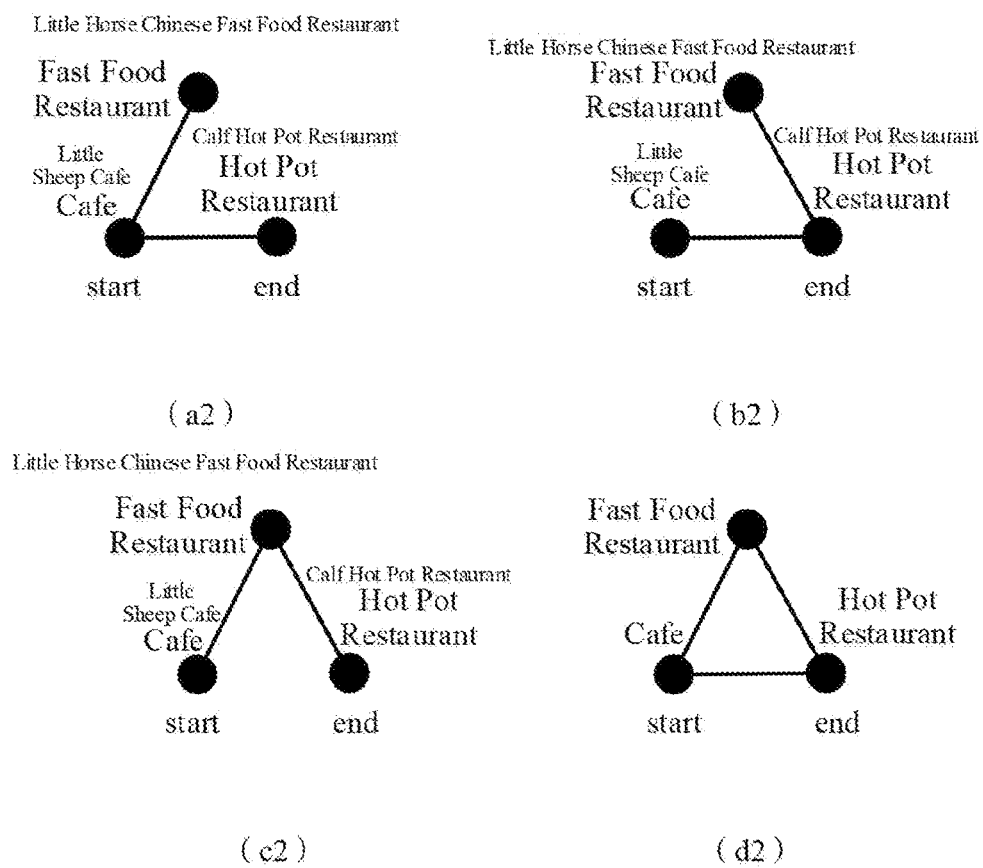
FIG. 4 is a schematic diagram of a second preset graphlet.

FIG. 4 is a schematic diagram of a second preset graphlet. Four examples (a2), (b2), (c2), (d2) of the second preset graphlet one-to-one corresponding to the four examples of the first preset graphlet are shown. In the second preset graphlet, each node respectively represents an instantiated POI. In FIG. 4, the identification of each POI is used to respectively represent the instantiated POI, such as "Little Sheep Cafe", "Calf Hot Pot Restaurant", and "Little Horse Chinese Fast Food Restaurant". It can be seen that the second preset graphlet is a graphlet formed by instantiating the attribute information of the POIs in the first preset graphlet as specific POIs, that is, the second preset graphlet may be constructed by replacing the attribute information of the POIs in the first preset graphlet with instantiated POIs. Alternatively, the first preset graphlet may be constructed by replacing the POIs in the second preset graphlet with attribute information such as its category.

Then, the frequency of that the attribute information of the target POI and the relationship between the attribute information of the target POI conforms to a preset situation may be counted as follows: on the basis of the POIs connection relationship, counting the frequency of that the relationship between target POIs conforms to the situation of each second preset graphlet respectively; and for each first preset graphlet, counting a frequency of that the attribute information of the target POIs and the relationship between the attribute information of the target POIs both conform to a preset situation corresponding to the first preset graphlet, based on attribute information of POIs in each second preset graphlet and the counting result of the frequency of that the relationship between target POIs conforms to the situation of each second preset graphlet respectively.

Specifically, the POIs connection relationship graph includes association relationships between instantiated target POIs, and a subgraph of a relationship between the POIs represented by each second preset graphlet may be extracted from the POIs relationship graph; then, based on the attribute information, such as the categories, of POIs in each second preset graphlet, the number of subgraphs corresponding to the attribute information of the POIs represented by a corresponding first preset graphlet and the relationship between the attribute information of the POIs represented by the corresponding first preset graphlet may be counted, and used as the counting result of the frequency of that the attribute information of the target POIs and the relationship between the attribute information of the target POIs both conform to the preset situation corresponding to the first preset graphlet.

In this way, the subgraph corresponding to each second preset graphlet may be directly extracted based on the POIs connection relationship graph, and then the attribute information of the POIs in each subgraph may be mapped to the frequency counting result of the corresponding first preset graphlet, so that the graphlet mining result of the first preset graphlet can be obtained efficiently and quickly.

Alternatively, the preset graphlet further includes at least one third preset graphlet, the third preset graphlet including a pair of nodes and a neighboring node connected to at least one node in the pair of nodes, and connection relationships between nodes in different third preset graphlets are different.

Figure 5:
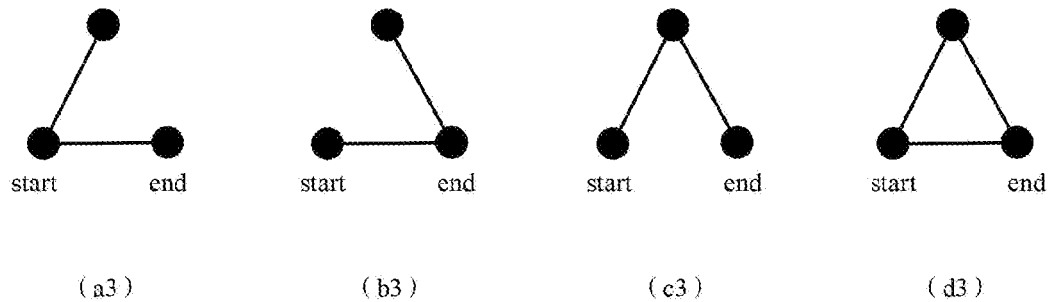
FIG. 5 is a schematic diagram of a third preset graphlet.

FIG. 5 is a schematic diagram of a third preset graphlet. In the structure of the third preset graphlet, a node corresponds to a generalized POI, that is, it may correspond to any POI, and does not correspond to a specific POI or specific attribute information of a POI. Two nodes of a pair of nodes respectively have the start node label "start" and the end node label "end". In practice, the third preset graphlet is equivalent to a graphic structure obtained by removing the attribute information of the POIs in the first preset graphlet. For example, FIG. 5 shows four types of the third preset graphlets (a3), (b3), (c3), (d3) corresponding to the four examples of the first preset graphlet in FIG. 3 one-to-one.

In this regard, the counting the frequency of the situation where the relationship between the attribute information of the target POI conforms to the relationship represented by the preset graphlet, based on the POIs connection relationship graph, further includes: counting the frequency of the situations conforming to the relationship represented by each third preset graphlet, based on the counting result of the frequency of that the attribute information of the target POIs and the relationship between the attribute information of the target POIs both conform to the preset situation corresponding to the first preset graphlet.

Here, based on the frequency counting result of the preset situation corresponding to each first preset graphlet, the frequency counting results of first preset graphlets corresponding to the structure of a same third preset graphlet may be summarized, to obtain a frequency counting result of the situation that conforms to the graph structure of each third preset graphlet.

For example, the structure of two first preset graphlets X and Y is the structure of the example (a1) as in FIG. 3. The attribute information of the three POIs in X are "cafe", "hot pot restaurant", and "fast food restaurant". The attribute information of the three POIs in Y are "fast food restaurant", "barbecue restaurant", and "shopping center" respectively. When counting the occurrence frequency of the preset situation corresponding to the first preset graphlet, X and Y are respectively summarized to the frequency counting results of different first preset graphlets. Since the connection relationship between the nodes in X and Y is consistent with a same third preset graphlet (example (a3) in FIG. 5), when counting the occurrence frequency of the preset situation corresponding to the third preset graphlet, the frequency counting results of the different first preset graphlets corresponding to X and Y are summarized in the occurrence frequency counting result of the preset situation corresponding to the example (a3) of the third preset graphlet in FIG. 5.

In practice, the above preset graphlets may be constructed as follows: first, constructing the graph structure of the third preset graphlet (as shown in FIG. 5), denoted as SE-labeled graphlet, which contains nodes, the start node label "start" and the end node label "end", and edges connecting the nodes. Then, replacing each node in the third preset graphlet SE-labeled graphlet with an attribute (such as a category) of a POI and attaching it to the graph structure, to obtain a first preset graphlet, denoted as CSE graphlet. Afterwards, embodying each of the attributes of the POIs in the first preset graphlet as a corresponding POI, to obtain the second preset graphlet, denoted as Instanced CSE graphlet. FIGS. 3, 4, and 5 respectively show examples of the first preset graphlet CSE graphlet, the second preset graphlet Instanced CSE graphlet, and the third preset graphlet SE-labeled graphlet.

In the present embodiment, a random walk method may be used on the above POIs connection relationship graph, to perform operations repeatedly as follows: selecting two POIs $p_i$ and $p_j$, randomly selecting at least one neighboring POI $p_l$ of $p_i$ or $p_j$, constructing a second preset graphlet Instanced CSE graphlet based on the POIs $p_i$, $p_j$ and $p_l$, and then replacing each POI in the second preset graphlet Instanced CSE graphlet with the category or other attribute information corresponding to the POI, thereby constructing a corresponding first preset graphlet CSE graphlet, and increasing by one the frequency counting number of the third preset graphlet consistent with this first preset graphlet CSE graphlet in the frequency counting results corresponding to the third preset graphlets. In this regard, the frequency counting result corresponding to each third preset graphlet may be obtained, and the frequency counting result corresponding to each third preset graphlet includes the frequency counting results of first preset graphlets consistent with the graphic structure of the third preset graphlet.

The frequency counting results of the third preset graphlets may be used as the graphlet mining result. Since the frequency counting results of the third preset graphlet includes the counting results of the first preset graphlets, a potential relationship between POIs may be obtained through multi-level data mining of the relationship between the POIs.

In some alternative implementations of the above embodiments, the relationship feature of the first POI and the second POI may be generated as follows: for each first preset graphlet, sorting in descending order based on the number of preset situations corresponding to the second preset graphlet included in preset situations corresponding to the first preset graphlet, to obtain the first sorting list and the second sorting list.

Then, generating a first relationship feature of the first POI and the second POI based on the ranking positions of the respective preset graphlets where the attribute information of the first POI and the attribute information of the second POI co-occur in the first sorting list and occurrence frequencies of corresponding preset situations; and generating a second relationship feature of the first POI and the second POI, based on ranking positions of preset graphlets where the attribute information of the first POI and the attribute information of the second POI co-occur in the second sorting list and occurrence frequencies of corresponding preset situations.

The first relationship feature and the second relationship feature of the first POI may be input into the pre-trained relationship prediction model for prediction. In some alternative implementations of the foregoing embodiments, the relationship prediction model may include a self-attention module and a cross-attention module.

The method may further include: generating a joint attribute feature of the first POI and the second POI based on the attribute information of the first POI and the attribute information of the second POI. For example, the attribute information of the first POI may be converted into a first feature vector, and the attribute information of the second POI may be converted into a second feature vector. The first feature vector and the second feature vector are spliced to form the joint attribute feature. Alternatively, a regional feature of the region to which the first POI belongs and a regional feature of the region to which the second POI belongs may also be fused into the above joint attribute feature.

Figure 6:
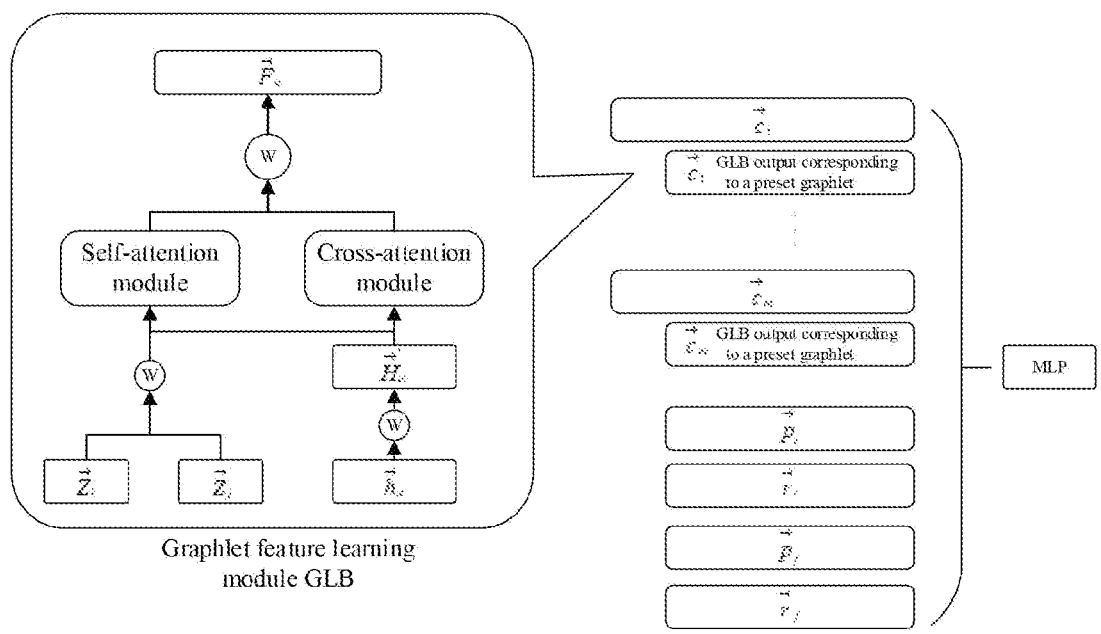
FIG. 6 is a structural schematic diagram of a relationship prediction model.

With reference to FIG. 6, illustrating a structural schematic diagram of a relationship prediction model. The relationship prediction model may be constructed based on the structure of transformer. It includes a graphlet feature learning module GLB, and the graphlet feature learning module GLB includes a self-attention module and a cross-attention module. The self-attention module processes the second relationship feature based on a preset self-attention mechanism, and the cross-attention module processes the joint attribute feature and the second relationship feature based on a preset cross-attention mechanism.

For a given first POI $p_i$ and second POI $p_j$, the corresponding joint attribute feature is $\{p_i, p_j\}$, the features of the regions to which the first POI and the second POI belong is $\{r_i, r_j\}$, the first relationship feature is $\vec{C}_a = \{\vec{c}_a\}$, the second relationship feature is $\vec{H}_a = \{\vec{h}_a\}$, where the subscript a represents one of a plurality of preset graphlets, $\vec{c}_a$ and $\vec{h}_a$ respectively represent the occurrence frequency of a preset situation corresponding to a preset graphlet, $\{\vec{c}_a\}$ represents the occurrence frequencies of the preset situations corresponding to the respective preset graphlets sorted according to the above first sorting list, and $\{\vec{h}_a\}$ represents the occurrence frequencies of the preset situations corresponding to the preset graphlets sorted according to the above second sorting list.

The preset self-attention mechanism operates as follows: for a second relationship feature $\vec{H}_a$, a compressed representation $\vec{H}'_a$ may be obtained through a dense layer transform:

$$\vec{H}'_a = \vec{H}_a W^i, \qquad (1)$$

$W_i$ represents the parameter of the dense layer transform. Then, according to the single-head self-attention conversion matrix of formula (2), the matrix $\vec{\alpha}_{s,a}$ is obtained by conversion:

$$\vec{\alpha}_{s,a} = \text{soft max}\left(\vec{H}'_a \vec{W}^Q_s \left(\vec{H}'_a \vec{W}^K_s\right)^T\right)\left(\vec{H}'_a \vec{W}^V_s\right), \qquad (2)$$

$\vec{W}^Q_s$, $\vec{W}^K_s$, and $\vec{W}^V_s$ respectively represent weight parameters of the "query" vector, "key" vector, and "value" vector in the QKV (query-key-value) model of the self-attention mechanism, s is used to identify the self-attention mechanism.

Then, conversion is performed according to the multi-head self-attention conversion matrix of formula (3):

$$\vec{\Lambda}_{s,a} = \left(\vec{\alpha}^1_{s,a} \oplus \ldots \oplus \vec{\alpha}^h_{s,a}\right) W^m_s, \qquad (3)$$

$\vec{\alpha}^1_{1s,a}, \vec{\alpha}^1_{2s,a}, \ldots, \vec{\alpha}^{hs}_{1,a}$, successively represent that the conversion operation of the above formula (2) is performed once, the conversion operation of the above formula (2) is performed twice, . . . , the conversion operation of the above formula (2) is performed h times, and $W^m_s$ is the weight matrix.

Then, the feature output by the self-attention module is generated through residual connection of formula (4):

$$\vec{H}'_a = \vec{H}'_a \circ \vec{\Lambda}_{s,a} + \vec{H}'_a, \qquad (4)$$

∘ represents Hadamard product.

The preset cross-attention mechanism operates as follows:

For the feature $\vec{p}$ of the POI determined based on the attribute information of the POI and the regional feature $\vec{r}$ of the region to which the POI belongs, $\vec{p}$ and $\vec{r}$ are spliced into $\vec{Z} = \vec{p} \oplus \vec{r}$, $\vec{Z}_i = \vec{p}_i \oplus \vec{r}_i$, $\vec{Z}_j = \vec{p}_j \oplus \vec{r}_j$. Similar to the self-attention mechanism, a compressed representation is obtained through a dense layer transform:

$$\vec{Z}'_a = \vec{Z}_a W^i, \quad (5)$$

a is the identification of the preset graphlet, for example, the examples shown in FIG. 3, (a1), (b1), (c1), (d1) respectively represent preset graphlets having different identifications, $W^{\prime i}$ represents the parameter of the dense layer transform, and $W^{\prime i}$ may be the same as $W^i$ in the aforementioned self-attention mechanism. Then, according to the single-head cross-attention conversion matrix of formula (6), the matrix $\vec{\alpha}_{c,a}$ is obtained by conversion:

$$\vec{\alpha}_{c,a} = \text{soft max}\left(\vec{Z}'_a \vec{W}_c^Q \left(\vec{H}'_a \vec{W}_c^K\right)^T\right)\left(\vec{H}'_a \vec{W}_c^V\right), \quad (6)$$

$\vec{W}_c^Q$, $\vec{W}_c^K$, and $\vec{W}_c^V$ respectively represent weight parameters of the "query" vector, "key" vector, and "value" vector in the QKV (query-key-value) model of the cross-attention mechanism, c is used to identify the cross-attention mechanism.

Then, conversion is performed according to the multi-head cross-attention conversion matrix of formula (7):

$$\vec{\Lambda}_{c,a} = \left(\vec{\alpha}_{c,a}^1 \oplus \ldots \oplus \vec{\alpha}_{c,a}^h\right) W_c^m, \quad (7)$$

$\vec{\alpha}_{1c,a}, \vec{\alpha}_{2c,a}, \ldots, \vec{\alpha}_{hc',a}$, successively represent that the conversion operation of the above formula (6) is performed once, the conversion operation of the above formula (6) is performed twice, ..., the conversion operation of the above formula (6) is performed h times, and $W_c^m$ is the weight matrix.

Then, the feature output by the cross-attention module is generated through residual connection of formula (8):

$$\vec{Z}''_a = \vec{Z}'_a \circ \vec{\Lambda}_{c,a} + \vec{Z}'_{a_0} \quad (8)$$

Further, the features output by the self-attention module and the cross-attention module may be spliced according to formula (9):

$$\vec{F}_a = \left(\vec{H}''_a \oplus \vec{Z}''_a\right) W_a^f, \quad (9)$$

$\vec{F}_a$ is the spliced feature, and $W_a^f$ is the weight matrix.

The self-attention module may put more attention on distinguishing features extracted from the preset graphlets, thereby helping the relationship prediction model to better apply the graphlet mining results. The cross-attention module may adaptively learn features about competition relationship prediction, based on the attribute information of the POIs and the different regions to which the POIs belong.

Further, the pre-trained relationship prediction model further includes: a multi-layer perceptron; and the multi-layer perceptron is configured to predict a competition relationship between the first POI and the second POI, based on the first relationship feature corresponding to respective preset graphlets, a feature output by the self-attention module, and a feature output by the cross-attention module.

As shown in FIG. 6, the first relationship features $\vec{c}_1, \vec{c}_2, \ldots, \vec{c}_m$ corresponding to m preset graphlets and the features $\vec{F}_1, \vec{F}_2, \ldots, \vec{F}_m$, output by the graphlet feature learning module GLB corresponding to the m preset graphlets are input into the multi-layer-perceptron (MLP), and the multi-layer perceptron MLP may output a judgment result of a competition relationship between the first POI and the second POI. Alternatively, the attribute feature $\vec{p}_i$ of the first POI and the regional feature $\vec{r}_i$ of the region to which the first POI belongs, the attribute feature $\vec{p}_j$ of the second POI and the regional feature $\vec{r}_j$ of the region to which the second POI belongs may also be input into the multi-layer perception MLP.

It should be noted that, each weight matrix in FIG. 6 is schematically shown as "W", and those skilled in the art may understand that the weight matrixes in the relationship prediction model may be different from each other.

By adopting the relationship prediction model shown in FIG. 6, it is possible to accurately extract features related to the competition relationship between POIs from graphlet mining results of the preset graphlets, thereby obtaining more accurate competition relationship analysis results.

In some alternative implementations of the above embodiments, the method may further include a step of configuring a service resource related to the first POI based on the competition relationships between the first POI and at least two second POIs. Here, the service resource may include types of products provided by a POI, types and quantities of services provided by a POI, the time when a POI provide services, and so on. Specifically, the service resource configuration may be performed according to preset rules. For example, when the number of second POIs having competition relationships with the first POI exceeds a preset number, the product type provided by the first POI is updated, or a new product provided by the first POI is added to enhance the competitiveness of the first POI. This implementation may intelligently configure service resources for the first POI, and realizes reasonable planning and configuration of the service resource.

Figure 7:
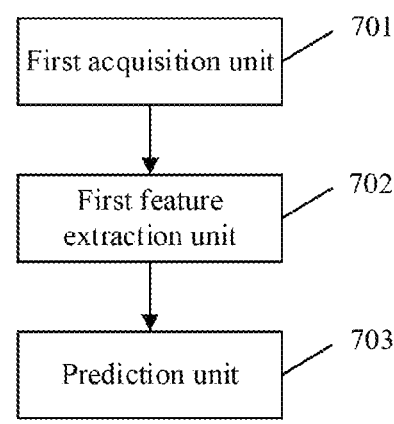
FIG. 7 is a schematic structural diagram of an apparatus for mining a competition relationship between POIs according to an embodiment of the present disclosure.

With further reference to FIG. 7, as an implementation of the method for mining a competition relationship between POIs, an embodiment of the present disclosure provides an apparatus for mining a competition relationship between POIs, and the apparatus embodiment corresponds to the above various method embodiment, and the apparatus may be specifically applied to various electronic devices.

As shown in FIG. 7, an apparatus 700 for mining a competition relationship between POIs of the present embodiment includes: a first acquisition unit 701, a first feature extraction unit 702 and a prediction unit 703. The first acquisition unit 701 is configured to acquire a graphlet mining result obtained by mining map retrieval data of users, the map retrieval data comprising attribute information of retrieved target POIs, the graphlet mining result comprising occurrence frequencies of respective preset situations, and a preset situation comprising: conforming to attribute information of POIs represented by a corresponding preset graphlet and a preset association relationship between attribute information of at least two POIs represented by the corresponding preset graphlet. The first feature extraction unit 702 is configured to, for a first POI and a second POI between which a competition relationship is to be determined, determine, based on the graphlet mining result, an occurrence frequency of a preset situation corresponding to a preset graphlet where attribute information of the first POI and attribute information of the second POI co-occur, and generating a relationship feature of the first POI and the second POI based on the determined occurrence frequency of the preset situation corresponding to the preset graphlet where the attribute information of the first POI and the attribute information of the second POI co-occur. The prediction unit 703 is configured to input the relationship feature of the first POI and the second POI into a pre-trained relationship prediction model to obtain a competition relationship prediction result of the first POI and the second POI.

In some embodiments, the apparatus further includes: a second acquisition unit, configured to acquire the map retrieval data of the users, wherein the map retrieval data comprises time information when the users retrieve the target POIs; a construction acquisition unit, configured to construct, based on associations between time information of different target POIs retrieved by same users, a POIs connection relationship graph representing relationships between target POIs; and a mining unit, configured to count, on the basis of the POIs connection relationship graph, occurrence frequencies of preset situations corresponding to respective preset graphlets, to obtain the graphlet mining result.

In some embodiments, the preset graphlet includes: at least one first preset graphlet, the first preset graphlet representing attribute information of a pair of associated POIs and an association relationship between the attribute information of the pair of POIs and attribute information of at least one neighboring POI.

In some embodiments, the preset graphlet further includes: at least one second preset graphlet, the second preset graphlet representing a pair of associated POIs and an association relationship between the pair of POIs and at least one neighboring POI; and the mining unit includes: a first counting unit, configured to respectively count, based on the POIs connection relationship graph, frequencies of that the relationships between the target POIs conform to preset situations corresponding to respective second preset graphlets, to obtain counting results; and a second counting unit, configured to, for each first preset graphlet, respectively counting, based on attribute information of POIs in the second preset graphlets and the counting results of the frequencies of that the relationships between the target POIs respectively conform to the preset situations corresponding to the second preset graphlets, a frequency of that the attribute information of the target POIs and a relationship between the attribute information of the target POIs both conform to a preset situation corresponding to the first preset graphlet.

In some embodiments, the preset graphlet further includes: at least one third preset graphlet, the third preset graphlet comprising a pair of nodes and a neighboring node connected to at least one node in the pair of nodes, and node connection relationships in different third preset graphlets are different from each other; the mining unit further includes: a third counting unit, configured to, count a frequency of situations that conform to a graph structure of each third preset graphlet, based on counting results of frequencies of that the attribute information of the target POIs and the relationships between the attribute information of the target POIs both conform to the preset situations corresponding to the first preset graphlets.

In some embodiments, the first feature extraction unit includes: a third acquisition unit, configured to acquire a first sorting list of the occurrence frequencies of respective preset situations, and a second sorting list of a preset number of hot preset situations ranked top in the first sorting list; a first generation unit, configured to generate a first relationship feature of the first POI and the second POI, based on a ranking position of each preset graphlet, where the attribute information of the first POI and the attribute information of the second POI co-occur, in the first sorting list and occurrence frequencies of corresponding preset situations; and a second generation unit, configured to generate a second relationship feature of the first POI and the second POI, based on a ranking position of each preset graphlet, where the attribute information of the first POI and the attribute information of the second POI co-occur, in the second sorting list and occurrence frequencies of corresponding preset situations.

In some embodiments, the apparatus further includes: a second feature extraction unit, configured to generate a joint attribute feature of the first POI and the second POI based on the attribute information of the first POI and the attribute information of the second POI; the pre-trained relationship prediction model includes: a self-attention module and a cross-attention module; and the self-attention module processes the second relationship feature based on a preset self-attention mechanism, and the cross-attention module processes the joint attribute feature and the second relationship feature based on a preset cross-attention mechanism.

In some embodiments, the pre-trained relationship prediction model further includes: a multi-layer perceptron; and the multi-layer perceptron is configured to predict a competition relationship between the first POI and the second POI, based on the first relationship feature corresponding to preset graphlets, a feature output by the self-attention module, and a feature output by the cross-attention module.

In some embodiments, the apparatus further includes: a resource configuration unit, configured to configure a service resource related to the first POI based on the competition relationships between the first POI and at least two second POIs.

The apparatus 700 corresponds to the steps in the foregoing method embodiments. Therefore, the operations, features, and technical effects that can be achieved in the above method for mining a competition relationship between POIs are also applicable to the apparatus 700 and the units contained therein, and detailed description thereof will be omitted.

According to an embodiment of the present disclosure, an electronic device and a readable storage medium are provided.

Figure 8:
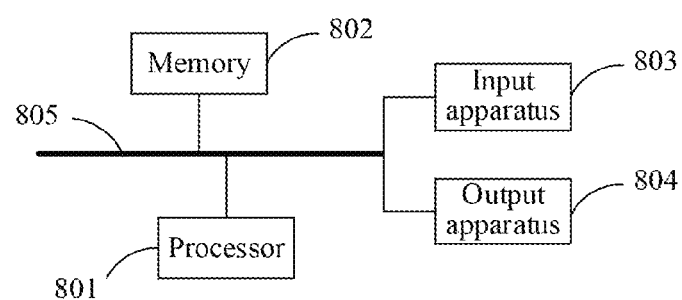
FIG. 8 is a block diagram of an electronic device used to implement the method for mining a competition relationship between POIs according to an embodiment of the present disclosure.

As shown in FIG. 8, a block diagram of an electronic device of the method for mining a competition relationship between POIs according to an embodiment of the present disclosure is illustrated. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 8, the electronic device includes: one or more processors 801, a memory 802, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations, for example, as a server array, a set of blade servers, or a multi-processor system. In FIG. 8, one processor 801 is used as an example.

The memory 802 is a non-transitory computer readable storage medium provided in an embodiments of the present disclosure. The memory stores instructions executable by at least one processor, so that the at least one processor performs the method for mining a competition relationship between POIs provided by embodiments of the present disclosure. The non-transitory computer readable storage medium of the present disclosure stores computer instructions for causing a computer to perform the method for mining a competition relationship between POIs provided in embodiments of the present disclosure.

The memory 802, as a non-transitory computer readable storage medium, may be used to store non-transitory software programs, non-transitory computer executable programs and modules, such as program instructions/modules corresponding to the method for mining a competition relationship between POIs in embodiments of the present disclosure (for example, the first acquisition unit 701, the first feature extraction unit 702 and the prediction unit 703 as shown in FIG. 7). The processor 801 executes the non-transitory software programs, instructions, and modules stored in the memory 802 to execute various functional applications and data processing of the server, that is, to implement the method for mining a competition relationship between POIs in the foregoing method embodiments.

The memory 802 may include a storage program area and a storage data area, where the storage program area may store an operating system and at least one function required application program; and the storage data area may store data created by the use of the electronic device for mining a competitive relationship between points of interest. In addition, the memory 802 may include a high-speed random access memory, and may also include a non-transitory memory, such as at least one magnetic disk storage device, a flash memory device, or other non-transitory solid-state storage devices. In some embodiments, the memory 802 may optionally include memories remotely provided with respect to the processor 801, and these remote memories may be connected to the electronic device for mining a competitive relationship between points of interest through a network. Examples of the above network include but are not limited to the Internet, intranet, local area network, mobile communication network, and combinations thereof.

The electronic device of the method for mining a competition relationship between POIs may further include: an input apparatus 803 and an output apparatus 804. The processor 801, the memory 802, the input apparatus 803, and the output apparatus 804 may be connected through a bus 805 or in other methods. In FIG. 8, connection through the bus 805 is used as an example.

The input apparatus 803 may receive input digital or character information, and generate key signal inputs related to user settings and function control of the electronic device of the method for mining a competitive relationship between points of interest, such as touch screen, keypad, mouse, trackpad, touchpad, pointing stick, one or more mouse buttons, trackball, joystick and other input apparatuses. The output apparatus 804 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated application specific integrated circuits (ASIC), computer hardware, firmware, software, and/or combinations thereof. These various embodiments may include: being implemented in one or more computer programs that may be executed and/or interpreted on a programmable system that includes at least one programmable processor. The programmable processor may be a dedicated or general purpose programmable processor, and may receive data and instructions from a memory system, at least one input apparatus, and at least one output apparatus, and transmit the data and instructions to the storage system, the at least one input apparatus, and the at least one output apparatus.

These computing programs, also referred to as programs, software, software disclosures, or codes, include machine instructions of a programmable processor, and may be implemented using high-level procedures and/or object-oriented programming languages, and/or assembly/machine languages. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

To provide interaction with a user, the systems and technologies described herein may be implemented on a computer, the computer has: a display apparatus for displaying information to the user, such as a Cathode Ray Tube (CRT) or an liquid crystal display (LCD) monitor; and a keyboard and pointing apparatus, such as a mouse or a trackball, and a user may use the keyboard and the pointing apparatus to provide input to the computer. Other types of apparatuses may also be used to provide interaction with the user. For example, the feedback provided to the user may be any form of sensory feedback, such as visual feedback, auditory feedback, or tactile feedback; and any form (including acoustic input, voice input, or tactile input) may be used to receive input from the user.

The systems and technologies described herein may be implemented in a computing system that includes backend components, e.g., as a data server, or in a computing system that includes middleware components, e.g., an application server, or in a computing system including front-end components, e.g., a user computer having a graphical user interface or a web browser through which a user may interact with embodiments of the systems and technologies described herein, or in a computing system including any combination of such backend components, middleware components, or front-end components. The components of the system may be interconnected by any form or medium of digital data communication, e.g., a communication network. Examples of communication networks include: Local Area Network (LAN), Wide Area Network (WAN), the Internet, and block chain networks.

The computer system may include a client and a server. The client and server are generally far from each other and usually interact through a communication network. The relationship between the client and the server is generated by computer programs that run on the corresponding computer and having a client-server relationship with each other.

The above description only provides an explanation of the preferred embodiments of the present disclosure and the technical principles used herein. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure, for example, technical schemes formed by the above-described features being interchanged with, but not limited to, technical features with similar functions disclosed in embodiments of the present disclosure.

What is claimed is:

1. A method for mining a competition relationship between points of interest (POIs), the method comprising:
   acquiring a graphlet mining result obtained by mining map retrieval data of users, the map retrieval data comprising attribute information of retrieved target POIs, the graphlet mining result comprising occurrence frequencies of respective preset situations, and a preset situation comprising: conforming to attribute information of POIs represented by a corresponding preset graphlet and a preset association relationship between attribute information of at least two POIs represented by the corresponding preset graphlet;
   for a first POI and a second POI between which a competition relationship is to be determined, determining, based on the graphlet mining result, an occurrence frequency of a preset situation corresponding to a preset graphlet where attribute information of the first POI and attribute information of the second POI co-occur, and generating a relationship feature of the first POI and the second POI based on the determined occurrence frequency of the preset situation corresponding to the preset graphlet where the attribute information of the first POI and the attribute information of the second POI co-occur; and
   inputting the relationship feature of the first POI and the second POI into a pre-trained relationship prediction model to obtain a competition relationship prediction result of the first POI and the second POI.

2. The method according to claim 1, wherein the method further comprises:
   acquiring the map retrieval data of the users, wherein the map retrieval data comprises time information when the users retrieve the target POIs;
   constructing, based on associations between time information of different target POIs retrieved by same users, a POIs connection relationship graph representing relationships between target POIs; and
   counting, on the basis of the POIs connection relationship graph, occurrence frequencies of preset situations corresponding to respective preset graphlets, to obtain the graphlet mining result.

3. The method according to claim 2, wherein the preset graphlet comprises:
   at least one first preset graphlet, the first preset graphlet representing attribute information of a pair of associated POIs and an association relationship between the attribute information of the pair of POIs and attribute information of at least one neighboring POI.

4. The method according to claim 3, wherein the preset graphlet further comprises:
   at least one second preset graphlet, the second preset graphlet representing a pair of associated POIs and an association relationship between the pair of POIs and at least one neighboring POI; and
   the counting, on the basis of the POIs connection relationship graph, the occurrence frequencies of the preset situations corresponding to the respective preset graphlets, comprises:
   respectively counting, based on the POIs connection relationship graph, frequencies of that the relationships between the target POIs conform to preset situations corresponding to respective second preset graphlets, to obtain counting results; and
   for each first preset graphlet, respectively counting, based on attribute information of POIs in the second preset graphlets and the counting results of the frequencies of that the relationships between the target POIs respectively conform to the preset situations corresponding to the second preset graphlets, a frequency of that the attribute information of the target POIs and a relationship between the attribute information of the target POIs both conform to a preset situation corresponding to the first preset graphlet.

5. The method according to claim 4, wherein the preset graphlet further comprises:
   at least one third preset graphlet, the third preset graphlet comprising a pair of nodes and a neighboring node connected to at least one node in the pair of nodes, and node connection relationships in different third preset graphlets are different from each other;
   the counting, on the basis of the POIs connection relationship graph, the occurrence frequencies of the preset situations corresponding to the respective preset graphlets, further comprises:
   counting a frequency of situations that conform to a graph structure of each third preset graphlet, based on counting results of frequencies of that the attribute information of the target POIs and the relationships between the attribute information of the target POIs both conform to the preset situations corresponding to the first preset graphlets.

6. The method according to claim 1, wherein the determining, based on the graphlet mining result, the occurrence frequency of the preset situation corresponding to the preset graphlet where the attribute information of the first POI and the attribute information of the second POI co-occur, and generating the relationship feature of the first POI and the second POI based on the determined occurrence frequency of the preset situation corresponding to the preset graphlet where the attribute information of the first POI and the attribute information of the second POI co-occur, comprises:
  acquiring a first sorting list of the occurrence frequencies of respective preset situations, and a second sorting list of a preset number of hot preset situations ranked top in the first sorting list;
  generating a first relationship feature of the first POI and the second POI, based on a ranking position of each preset graphlet, where the attribute information of the first POI and the attribute information of the second POI co-occur, in the first sorting list and occurrence frequencies of corresponding preset situations; and
  generating a second relationship feature of the first POI and the second POI, based on a ranking position of each preset graphlet, where the attribute information of the first POI and the attribute information of the second POI co-occur, in the second sorting list and occurrence frequencies of corresponding preset situations.

7. The method according to claim 6, wherein the method further comprises:
  generating a joint attribute feature of the first POI and the second POI based on the attribute information of the first POI and the attribute information of the second POI;
  the pre-trained relationship prediction model comprises: a self-attention module and a cross-attention module; and
  the self-attention module processes the second relationship feature based on a preset self-attention mechanism, and the cross-attention module processes the joint attribute feature and the second relationship feature based on a preset cross-attention mechanism.

8. The method according to claim 7, wherein the pre-trained relationship prediction model further comprises: a multi-layer perceptron; and
  the multi-layer perceptron is configured to predict a competition relationship between the first POI and the second POI, based on the first relationship feature corresponding to preset graphlets, a feature output by the self-attention module, and a feature output by the cross-attention module.

9. The method according to claim 1, wherein the method further comprises:
  configuring a service resource related to the first POI based on the competition relationships between the first POI and at least two second POIs.

10. An electronic device, comprising:
  at least one processor; and
  a memory, communicatively connected to the at least one processor; wherein,
  the memory, storing instructions executable by the at least one processor, the instructions, when executed by the at least one processor, cause the at least one processor to perform operations, the operations comprise:
  acquiring a graphlet mining result obtained by mining map retrieval data of users, the map retrieval data comprising attribute information of retrieved target POIs, the graphlet mining result comprising occurrence frequencies of respective preset situations, and a preset situation comprising: conforming to attribute information of POIs represented by a corresponding preset graphlet and a preset association relationship between attribute information of at least two POIs represented by the corresponding preset graphlet;
  for a first POI and a second POI between which a competition relationship is to be determined, determining, based on the graphlet mining result, an occurrence frequency of a preset situation corresponding to a preset graphlet where attribute information of the first POI and attribute information of the second POI co-occur, and generating a relationship feature of the first POI and the second POI based on the determined occurrence frequency of the preset situation corresponding to the preset graphlet where the attribute information of the first POI and the attribute information of the second POI co-occur; and
  inputting the relationship feature of the first POI and the second POI into a pre-trained relationship prediction model to obtain a competition relationship prediction result of the first POI and the second POI.

11. The device according to claim 10, wherein the operations further comprise:
  acquiring the map retrieval data of the users, wherein the map retrieval data comprises time information when the users retrieve the target POIs;
  constructing, based on associations between time information of different target POIs retrieved by same users, a POIs connection relationship graph representing relationships between target POIs; and
  counting, on the basis of the POIs connection relationship graph, occurrence frequencies of preset situations corresponding to respective preset graphlets, to obtain the graphlet mining result.

12. The device according to claim 11, wherein the preset graphlet comprises:
  at least one first preset graphlet, the first preset graphlet representing attribute information of a pair of associated POIs and an association relationship between the attribute information of the pair of POIs and attribute information of at least one neighboring POI.

13. The device according to claim 12, wherein the the preset graphlet further comprises:
  at least one second preset graphlet, the second preset graphlet representing a pair of associated POIs and an association relationship between the pair of POIs and at least one neighboring POI; and
  the counting, on the basis of the POIs connection relationship graph, the occurrence frequencies of the preset situations corresponding to the respective preset graphlets, comprises:
  respectively counting, based on the POIs connection relationship graph, frequencies of that the relationships between the target POIs conform to preset situations corresponding to respective second preset graphlets, to obtain counting results; and
  for each first preset graphlet, respectively counting, based on attribute information of POIs in the second preset graphlets and the counting results of the frequencies of that the relationships between the target POIs respectively conform to the preset situations corresponding to the second preset graphlets, a frequency of that the attribute information of the target POIs and a relationship between the attribute information of the target POIs both conform to a preset situation corresponding to the first preset graphlet.

14. The device according to claim 13, wherein the preset graphlet further comprises:
  at least one third preset graphlet, the third preset graphlet comprising a pair of nodes and a neighboring node connected to at least one node in the pair of nodes, and node connection relationships in different third preset graphlets are different from each other;

the counting, on the basis of the POIs connection relationship graph, the occurrence frequencies of the preset situations corresponding to the respective preset graphlets, further comprises:

counting a frequency of situations that conform to a graph structure of each third preset graphlet, based on counting results of frequencies of that the attribute information of the target POIs and the relationships between the attribute information of the target POIs both conform to the preset situations corresponding to the first preset graphlets.

15. The device according to claim 10, wherein the determining, based on the graphlet mining result, the occurrence frequency of the preset situation corresponding to the preset graphlet where the attribute information of the first POI and the attribute information of the second POI co-occur, and generating the relationship feature of the first POI and the second POI based on the determined occurrence frequency of the preset situation corresponding to the preset graphlet where the attribute information of the first POI and the attribute information of the second POI co-occur, comprises:

acquiring a first sorting list of the occurrence frequencies of respective preset situations, and a second sorting list of a preset number of hot preset situations ranked top in the first sorting list;

generating a first relationship feature of the first POI and the second POI, based on a ranking position of each preset graphlet, where the attribute information of the first POI and the attribute information of the second POI co-occur, in the first sorting list and occurrence frequencies of corresponding preset situations; and generating a second relationship feature of the first POI and the second POI, based on a ranking position of each preset graphlet, where the attribute information of the first POI and the attribute information of the second POI co-occur, in the second sorting list and occurrence frequencies of corresponding preset situations.

16. The device according to claim 15, wherein the operations further comprise:

generating a joint attribute feature of the first POI and the second POI based on the attribute information of the first POI and the attribute information of the second POI;

the pre-trained relationship prediction model comprises: a self-attention module and a cross-attention module; and the self-attention module processes the second relationship feature based on a preset self-attention mechanism, and the cross-attention module processes the joint attribute feature and the second relationship feature based on a preset cross-attention mechanism.

17. The device according to claim 16, wherein the pre-trained relationship prediction model further comprises: a multi-layer perceptron; and the multi-layer perceptron is configured to predict a competition relationship between the first POI and the second POI, based on the first relationship feature corresponding to preset graphlets, a feature output by the self-attention module, and a feature output by the cross-attention module.

18. The device according to claim 10, wherein the operations further comprise:

configuring a service resource related to the first POI based on the competition relationships between the first POI and at least two second POIs.

19. A non-transitory computer readable storage medium, storing computer instructions, the computer instructions being used to cause the computer to perform operations, the operations comprising:

acquiring a graphlet mining result obtained by mining map retrieval data of users, the map retrieval data comprising attribute information of retrieved target POIs, the graphlet mining result comprising occurrence frequencies of respective preset situations, and a preset situation comprising: conforming to attribute information of POIs represented by a corresponding preset graphlet and a preset association relationship between attribute information of at least two POIs represented by the corresponding preset graphlet;

for a first POI and a second POI between which a competition relationship is to be determined, determining, based on the graphlet mining result, an occurrence frequency of a preset situation corresponding to a preset graphlet where attribute information of the first POI and attribute information of the second POI co-occur, and generating a relationship feature of the first POI and the second POI based on the determined occurrence frequency of the preset situation corresponding to the preset graphlet where the attribute information of the first POI and the attribute information of the second POI co-occur; and inputting the relationship feature of the first POI and the second POI into a pre-trained relationship prediction model to obtain a competition relationship prediction result of the first POI and the second POI.

* * * * *